United States Patent

[11] 3,612,442

| | | | | | |
|---|---|---|---|---|---|
| [72] | Inventor | Dean M. Chisel Sunnyvale, Calif. | [56] | References Cited | |
| [21] | Appl. No. | 812,998 | | UNITED STATES PATENTS | |
| [22] | Filed | Apr. 3, 1969 | 3,195,303 | 7/1965 Widell | 60/231 |
| [45] | Patented | Oct. 12, 1971 | 3,229,461 | 1/1966 Jones | 244/52 X |
| [73] | Assignee | The United States of America as represented by the Administrator of the National Aeronautics and Space Administration | 3,246,863 | 4/1966 Posingies | 244/52 |
| | | | 3,325,121 | 6/1967 Banaszak et al. | 244/3.22 |
| | | | 3,502,285 | 3/1970 Gambill | 244/3.22 |

Primary Examiner—Verlin R. Pendegrass
Attorneys—Darrell G. Brekke and G. T. McCoy

[54] FLUIDIC PROPORTIONAL THRUSTER SYSTEM
2 Claims, 7 Drawing Figs.

[52] U.S. Cl. .................................................. 244/3.22
[51] Int. Cl. ...................................................... F42b 15/18
[50] Field of Search .......................................... 244/3.22, 1 SS, 52; 60/231; 239/265.23, 265.25

ABSTRACT: A proportional thruster system utilizing a fluidic vortex apparatus as means for controlling the continuous flow of gases supplied to a plurality of thrusters in response to detected vehicle attitude error signals. Continuous variable thrust for attitude control applications is provided by the flow of gas to a plurality of thruster nozzles through modulated vortex elements. The thruster system is responsive to electronic or fluidic sensed attitude error, sensors, and logic.

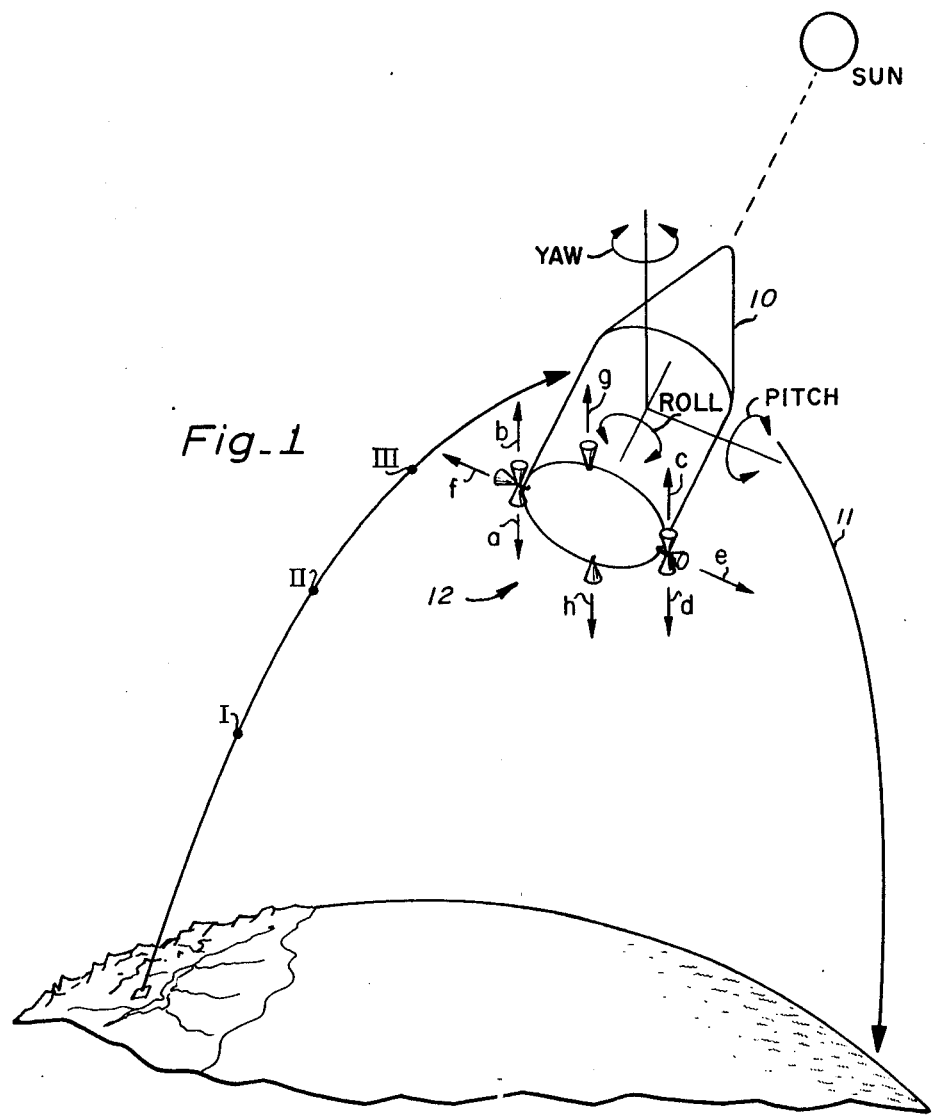
Fig_1
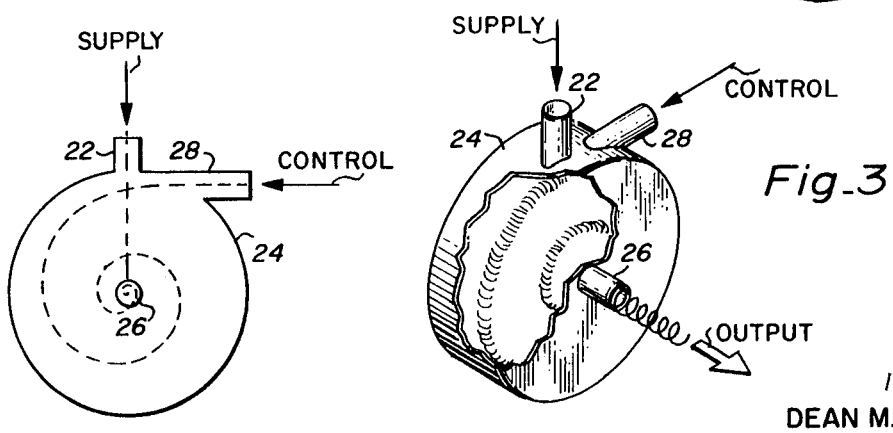
Fig_2  Fig_3
INVENTOR.
DEAN M. CHISEL
BY
ATTORNEYS

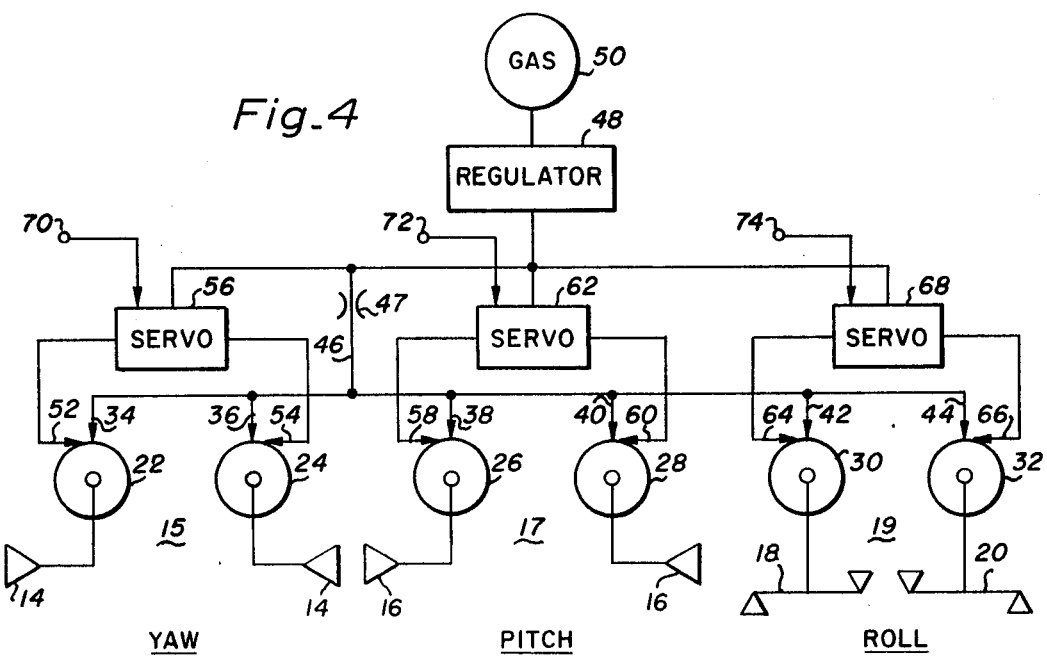
Fig_4
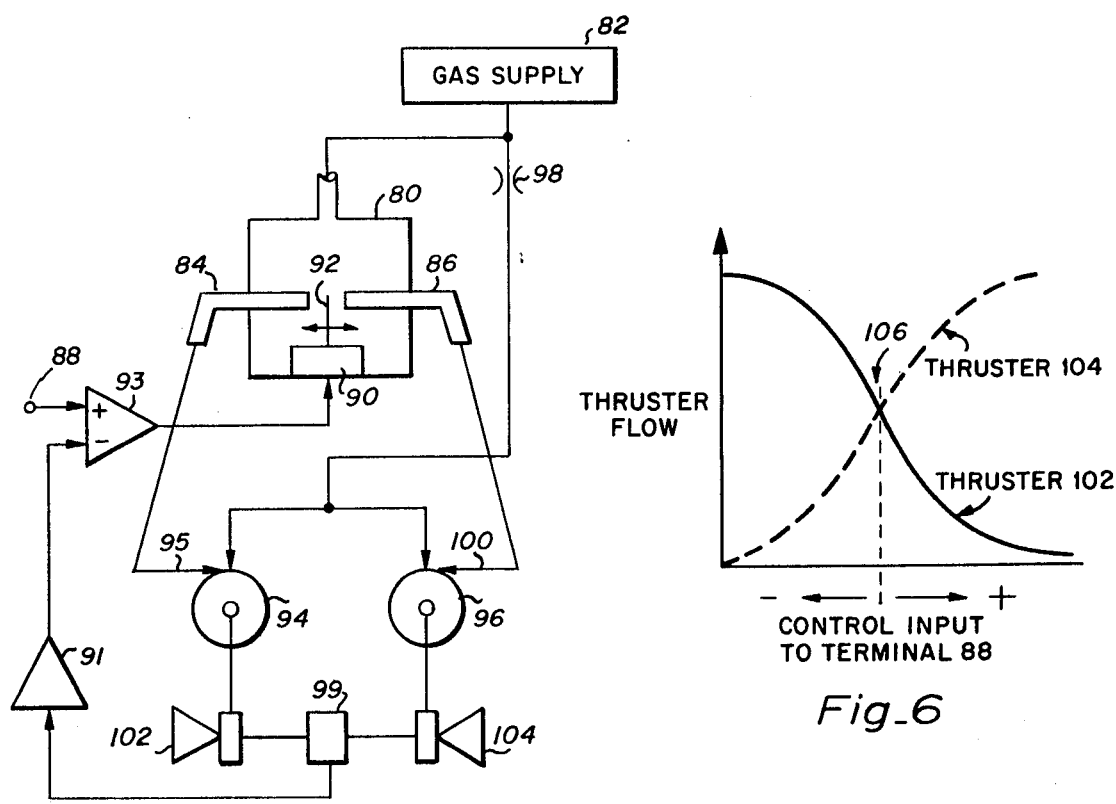
Fig_5
Fig_6

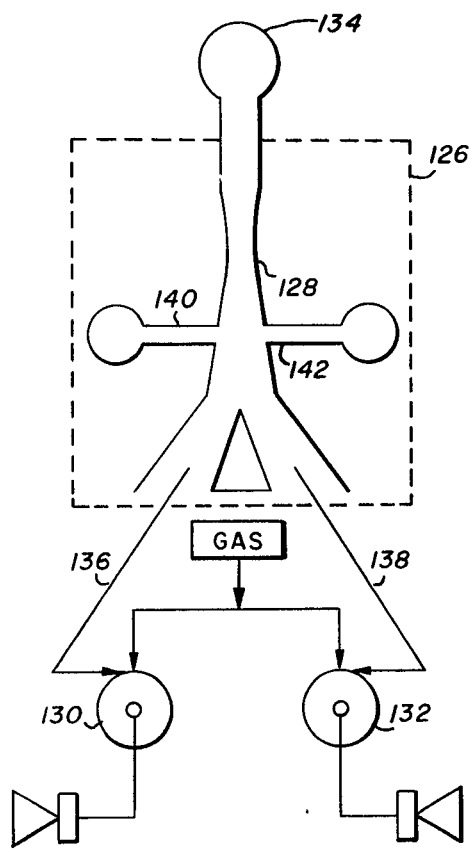
Fig_7

FLUIDIC PROPORTIONAL THRUSTER SYSTEM

BACKGROUND OF THE INVENTION

Fluidic principles have heretofore been applied to thruster devices for controlling the attitude of rocket and space vehicles. See for example, the U.S. Pats. to Warren et al. 3,204,405; Jones, 3,229,461; Chisel, 3,239,150; Posingies, 3,246,863; and Evans, 3,278,140. These mass expulsion torquing systems, however, use jet-thrust vectoring systems or bistable fluidic attitude control thrusters which provide control torque by pulsing the thrusters "on" and "off." Jet thrust vectoring is not effective unless some form of main jet propulsive thrust is available. Bistable mass expulsion systems, whether fluidic or the more conventional electromechanical solenoid-actuated type, impart finite impulse bits to the vehicle. These impulse bits force the vehicle into an attitude oscillation referred to by those skilled in the art as a limit cycle. These oscillations reflect the vehicle attitude rates and position accuracy. The impulse bit is the integral of the thrust and the time the thrust is produced for each pulse. The smaller the impulse bit the lower the body rates and better the pointing accuracy. The bistable system is pulsed between zero and a fixed preset level in step fashion. Care must be taken to insure the preset thrust level is high enough to overcome any anticipated disturbance torques and provide the desired attitude command rates and low enough to provide a reasonable sized impulse bit. The other factor contributing to an increase in impulse bit is the time duration of the thrust pulse. The minimum time duration is limited by the response and repeatability of the bistable system.

In utilizing mechanical valves to provide torque control by pulse modulating a gas flow, hysteresis, friction and varying flow coefficients are major factors in limiting the ability to provide true proportional thrust. In addition, the changes in discharge coefficient at low values of Reynolds number cause flow gain changes in such devices. Furthermore, as flows are varied the forces required to operate the valves change in a somewhat unpredictable manner.

With a true proportional system, there is no limit cycle since thrust is directly proportional to an input error signal and is transitionally varied rather than pulsed on and off. With a proportional system, the thrust can be continuously varied to adapt to any disturbance torque or desired command attitude acceleration. In the presently used "bang-bang" systems the pointing accuracy is a function of thruster response and thrust level. Since small impulse bits are required to achieve low body rates and precise pointing accuracy, the response required of the thrusters can exceed that available with state-of-the-art hardware. Such limitations are not encountered with a proportional control system.

SUMMARY OF THE INVENTION

The present invention is related generally to thruster systems for controlling the attitude of a moving body and more particularly, to a proportional vehicle attitude control apparatus using vortex amplifying devices to modulate continuous thruster-gas flows in response to electrical or fluidic command signals.

Briefly, the invention comprises the utilization of fluid logic vortex-amplifying apparatus as means for continuously controlling the application of thruster torques as required to attain or maintain a desired vehicle attitude. As in previous vehicle control apparatus, thruster nozzles are provided at appropriate positions for controlling the yaw, pitch, and roll thereof. However, in accordance with this invention a continuous but variable flow of gas is provided to the respective thrusters through a plurality of vortex-amplifying devices which are utilized to vary and thus control the thrust levels of the various thrusters in order to provide true proportional attitude control. The control inputs to the vortex-amplifying devices are provided by certain electromechanical or fluid logic servo devices which are actuated in response to detected attitude error signals provided by suitable attitude sensing apparatus.

A principal advantage of the present invention is that the vehicle is not subjected to a limit cycle since the respective thruster flows are not pulsed but are transitionally varied so as to always be directly related to the input error signals.

Another advantage of the present invention is that since the response of the proportional thrusters need be only slightly faster than the vehicle control dynamics the need for very high response solenoid valves is eliminated.

Still another advantage of the present invention is that there are no sliding seals in the thruster gas flow path which can malfunction due to contamination or unfavorable temperature conditions.

Still another advantage of the present invention is that the proportional system is fully compatible with electrical or fluidic input error signal control apparatus.

Still another advantage of the present invention is that the vortex units are operated push-pull, therefore the gas flow through the regulator is independent of thrust variation, thereby eliminating the hysteresis effect of the regulator and simplifying the regulation requirements. In addition, the regulator can be eliminated from the proportional system in applications where small gain variations can be tolerated.

Still another advantage of the present invention is the system's compatibility with a gas supply having a wide range of temperature and contamination.

Still another advantage of the present invention is that the response and linearity of the proportional thruster system can be readily varied for compatibility with the desired application.

It is, therefore, a principal object of the present invention to provide a proportional thruster system for continuously controlling the attitude of a space vehicle or the like. Another object of the present invention is to provide a proportional thruster system which requires no mechanical valves or sliding seals in the flow path between the gas source and the thruster nozzles.

Still another object of the present invention is to provide a proportional thruster system for controlling the yaw, pitch, and roll of a space vehicle using vortex-amplifying devices as the thrust control means.

Still other objects and advantages of the present invention will become apparent after having read the following description of the preferred embodiments of the invention which are illustrated in detail in the several figures of the drawings.

IN THE DRAWINGS

FIG. 1 is a schematic representation of a space vehicle having a plurality of thrusters for controlling the pitch, yaw, and roll thereof.

FIG. 2 is a diagrammatical illustration of a fluid vortex amplifying device of the type utilized in the present invention.

FIG. 3 is a partially broken-away illustration of a fluid vortex amplifier illustrating the operation thereof.

FIG. 4 is a schematic illustration of a three axis attitude control system in accordance with the present invention.

FIG. 5 is a schematic illustration of a fluidic thruster control subsystem in accordance with the present invention.

FIG. 6 is a thrust control diagram illustrating the operation of the present invention.

FIG. 7 is still another illustration of a fluidic thruster control subsystem in accordance with the present invention.

DESCRIPTION OF THE PREFERRED EMBODIMENT

In FIG. 1 of the drawing, there is shown for illustrative purposes, a vehicle 10 which has been hurled into space by a suitable launch vehicle. The vehicle 10 as illustration may, for example, be the payload section of a sounding rocket which has been separated from the booster stage at point I. In a typical launching operation, the vehicle 10 is despun between the points I and II. Between points II and III the vehicle 10 is aligned in pitch, yaw, and roll by the attitude control system. The sun is usually used as the pitch and yaw attitude reference and the earth's magnetic field, as sensed by a magnetometer apparatus, is used as the roll reference.

Once the vehicle 10 has been aligned such that the desired pointing has been obtained and the course control position errors are reduced to a low level, only small amounts of thrust are normally required to maintain the desired vehicle attitude until it again enters the earth's atmosphere at which time aerodynamic forces overpower the available control forces and tumbling occurs. During the relatively weightless state at the upper part of the trajectory, the control torques applied to the vehicle 10 through the thrusters 12 are most critical because of the low attitude rates and precise position control required. For purposes of illustration a plurality of control thrusters are shown on the vehicle 10 and include thruster nozzles a, b, c and d which control the vehicle roll, g and h which control vehicle pitch, and e and f which control the vehicle yaw.

In the prior art systems the thrusters were typically controlled by pulse width modulated thrust periods to provide periodic or "bang-bang" reaction torques. Using these systems the limit cycle as the vehicle attempted to maintain itself pointing was very much in evidence. In the "bang-bang" system, the pointing accuracy is a function of thruster response and thruster level as dictated by the maximum anticipated disturbance torque. And since small impulse bits are required to achieve high-pointing accuracy, the response required of the thrusters typically exceeded that available with state-of-the-art hardware. Such limitations are not encountered with the proportional control system of the present invention.

In FIGS. 2 and 3 of the drawings, the operation of a typical vortex amplifier as illustrated. It is well known that the momentum of a fluid stream tends to remain constant unless acted upon by some outside disturbing force. In the vortex amplifier, absent a control signal, the supply stream entering port 22 proceeds directly through the chamber 24 to the output port 26 in essentially a straight line. However, if a control signal is introduced in the form of a control stream at port 28, the supply stream is deflected and follows a vortex path which reduces the effective output through the output port 26. The output flow is therefore inversely proportional to the control flow and as a result the unit is an analog device whereby a relatively small control stream can be used to control a larger gas flow. Accordingly, this device is particularly suited for use in a proportional thrust control system.

Referring now to FIG. 4 of the drawings, a three-axis thrust control system in accordance with the present invention is illustrated in schematic form. The yaw control thrusters 14, the pitch control thrusters 16, and the roll control force-couple thrusters 18 and 20 are respectively connected to the output ports of the vortex amplifiers 22 through 32. The supply inlets 34 through 44 are commonly connected through suitable tubulation 46 and a flow regulator 48 to the gas supply 50, which may be either a hot or a cold gas source.

By providing a constant pressure gas supply source 50 or if small system gain changes can be tolerated the regulator 48 can be eliminated. Without a constant supply pressure the gain change of the proportional system is approximately equal to the ratio of the variation in supply pressure. Without the regulator the system is compatible with gas supply temperatures ranging from cryogenic conditions to 2,600° F. and contamination particles to 200 microns. The system operates push-pull under continuous gas flow conditions, therefore, the regulator requirements are minimal. The regulator is not required to shut off the gas flow as in the case of solenoid actuated "bang-bang" systems; and thrust changes do not reflect any flow changes through the regulator. To satisfy these minimal requirements the regulator can be designed with all metallic parts, large flow areas and no sliding parts. As a result the use of a regulator will not limit allowable gas contamination, however, the maximum allowable system gas temperature will be reduced to approximately 2,000° F.

The control inputs 52 and 54 of the yaw control subsystem 15 are connected to the outputs of a suitable servocontrol system 56. The control inputs 58 and 60 of the pitch subsystem 17 are connected to the outputs of the fluid control servo 62 and the control inputs 64 and 66 of the roll control subsystem 19 are connected to the outputs of the flow control servo 68.

Although the fluid inputs to the servos 56, 62, and 68 may be obtained from any suitable gas source, they are, for simplicity, in this system connected to the gas source 50 through regulator 48. The servos, in this case, may be any suitable type of fluid control servomechanism and the energizing input thereto is schematically provided at the terminals 70, 72, and 74. Exemplary embodiments of servos suitable for use in this application will be described below.

In operation, the regulator 48 is normally regulated to allow a controlled flow of gas to escape from the source 50 through orifice 47 and line 46 to the supply inputs 34-44 of the vortex amplifiers 22-32 so that the maximum thrust available to the yaw, pitch, and roll control thrusters is sufficient to cause the vehicles 10 to achieve and maintain the desired attitude. Where a vehicle misorientation is sensed by appropriate attitude sensors as mentioned above, control signals, which may be either fluid or electrical, in response to the attitude error are supplied to the servos 56, 62 and 68 through the terminals 70, 72, and 74 respectively, as required to maintain the desired attitude of the vehicle 10.

The control signals provided to the respective servos cause unbalanced gas flow outputs therefrom which are supplied to the control inputs of the various vortex amplifiers so as to cause the gas emanating from the respective thrusters to be proportionally controlled in response to the sensed attitude error. Since the gas flows to the respective thrusters are not pulsed but are varied in analog fashion, the effect of the system is to provide true proportional control with virtually no limit cycling.

Referring now to FIG. 5 of the drawings, a single-axis version of the three-axis system depicted in FIG. 4 as illustrated. It consists of a simple flapper type of servomechanism with an input signal from a combined summing and driving amplifier 93. Gas supply 82 simultaneously provides gas for the servo chamber 80 and vortex elements 94 and 96. The pressure ration required between the servo supply and vortex supply is a fixed ratio. This ratio is maintained by the use of simple choked orifice 98 in the connecting line. After entering the chamber 80 the gas is equally divided through two outlet ports 84 and 86 when no control impulse is supplied to terminal 88. The output of amplifier 93 is coupled to flapper control mechanism 90 which varies the position of a pivoted flapper 92, the position left or right of center of which causes the flow through outlet ports 84 and 86 to be imbalanced in a desired manner. The position of the flapper right or left of the neutral position shown is thus a function of the input electrical signal polarity and magnitude.

The main gas supply to the vortex amplifiers 94 and 96 is provided through suitable tubulation 98 which leads to the regulator and gas source as shown in FIG. 4. The servo outlets 84 and 86 are connected to the control inlets 95 and 100 of the respective vortex amplifiers 94 and 96 which act to modulate the output flow through the thrusters 102, and 104 in accordance with the electrical input applied to terminal 88.

For example, as the electrical signal applied to terminal 88 increases positively, the flapper 92 is moved to the right so as to increase the gas flow through the control inlet 95 causing the thrust output of thruster 102 to be less than that out of thruster 104 since the control stream applied at 95 exceeds that applied at 100. Likewise, when a control signal of opposite polarity is applied to terminal 88, the imbalance of flow between outlets 84 and 86 is reversed causing the thruster 102 to produce a larger output than the thruster 104.

FIG. 6 shows the modulation characteristics of the vortex amplifiers 94 and 96 and illustrates the method of controlling the torque applied to the vehicle bearing the thrusters 102 and 104. With no input error signal to the servo 80, the control flows through outlets 84 and 86, respectively, are equal and the output flow from the vortex amplifier 94 equals the output flow from vortex amplifier 96. This condition is illustrated by the midpoint 106 of the curves shown in FIG. 6. Since the flows from the vortex units into their respective thrusters 102 and 104 are thus equal, and the thrusters are pointed in opposite directions, the torque imparted to the supporting vehicle is zero.

This system can thus be used over a wide range of attitude control energies by simply regulating the gas flow supplied to the control inlet 82 and the supply inlet 98 of the thruster system. In the attitude control system of FIG. 4, this can be accomplished simultaneously for all three attitude correction subsystems by a single regulator 48. For example, attitude control of the vehicle 10 is shown in FIG. 1 during the initial despin and course acquisition period will require greater thrust from the attitude correction thrusters 12 than will be required after course acquisition is obtained. In this embodiment, the regulator 48 can be controlled to provide a large gas flow during the initial periods and a substantially reduced flow during the later periods of flight. It is also quite possible using this system to substantially reduce gas consumption by shutting off the gas flow entirely or at least to a substantial degree when no control function is required.

The dynamic and static flexibility of the system in FIG. 5 can be readily improved by the addition of a simple electronic circuit. With this circuit the response, gain and linearity characteristics of the proportional thruster system can be varied. This is accomplished by sensing the differential pressure at the inlet of the opposing thrusters 102 and 104. The differential pressure sensed is a function of the net thrust applied about the vehicle's control axis. This pressure parameter is sensed with a pneumatic-to-electrical differential pressure transducer 99. The electrical signal is fed through a DC high gain amplifier 91 with the necessary feedback and input impedances to obtain the desired system static and response characteristics within the response limitations of the proportional system. The output of the high gain amplifier 91 is then summed at the driving amplifier 93. With this system the output thrust linearity can be improved, different response characteristics can be introduced and system gains can be easily changed.

Turning now to FIG. 7 of the drawings, still another alternative servosystem 126 is shown using a proportional fluid amplifier 128 to control the flow to the vortex amplifiers 130 and 132. In this embodiment, the control flow from a source 134 will be equally divided through the control ports 136 and 138 until control flows applied to one of the control jets 140 or 142 causes the flow to be directed proportionally to one or the other of the control lines 136 and 138, depending upon the particular type of fluid amplifier utilized. This proportional fluid amplifier can be directly interfaced with fluidic control logic and attitude sensors.

In accordance with the present invention, it will be apparent that a substantially improved thruster control system is provided. The system is not only simpler in mechanical detail but also has other advantages not provided by prior art methods. For example, this system allows contamination particles as large as 200 microns to be passed through the system without causing malfunction. Similarly, since there are no mechanical valves in the main gas supply path the system is substantially independent of gas temperature or composition.

After having read the above disclosure, many alterations and modifications of the invention will become apparent to those of skill in the art. For example, the vortex apparatus disclosed by Fox et al. in U.S. Pat. No. 3,336,931 or any other suitable type of vortex amplifier device may be utilized to accomplish the intended control function. It is therefore to be understood that this description of preferred embodiments is for purposes of illustration only and is in no manner intended to be limiting in any way. Accordingly, I intend that the appended claims be interpreted as covering all modifications which fall within the true spirit and scope of my invention.

What is claimed is:

1. A proportional mass expulsion thrust control system sensitive to yaw, pitch, and roll input control signals for the attitude control of a vehicle about a yaw axis, a pitch axis, and a roll axis comprising:
   a source of thrust producing gas;
   yaw, pitch, and roll servos each having an electrical input, a gas input and two gas outputs;
   means for connecting all of said servo gas inputs to said source of gas;
   first and second thruster means for moving said vehicle about said yaw axis;
   third and fourth thruster means for moving said vehicle about said pitch axis;
   fifth and sixth thruster means for moving said vehicle about said roll axis;
   first, second, third, fourth, fifth, and sixth vortex amplifiers each having a supply input, a control input and an output;
   means for connecting all of said supply inputs of said vortex amplifiers to said source of gas;
   means for connecting said two outputs of said yaw servo to said control inputs of said first and second vortex amplifiers, respectively;
   means for connecting said two outputs of said pitch servo to said control inputs of said third and fourth vortex amplifiers, respectively;
   means for connecting said two outputs of said roll servo to said control inputs of said fifth and sixth vortex amplifiers, respectively;
   means for connecting said outputs of said first, second, third, fourth, fifth, and sixth vortex amplifiers to said first, second, third, fourth, fifth, and sixth thruster means, respectively;
   said yaw servo electrical input being responsive to said yaw input control signal for proportionally controlling the amount of gas reaching said control inputs of said first and second vortex amplifiers and ultimately the amount of gas reaching said first and second thruster means, said control inputs of said first and second vortex amplifiers receiving equal amounts of gas when said yaw control input signal corresponds to zero error, said amount of gas received by said first and second thruster means being independent of the ambient pressure environment;
   said pitch servo electrical input being responsive to said pitch input control signal for proportionally controlling the amount of gas reaching said control inputs of said third and fourth vortex amplifiers and ultimately the amount of gas reaching said third and fourth thruster means, said control inputs of said third and fourth vortex amplifiers receiving equal amounts of gas when said pitch input control signal corresponds to zero error, said amount of gas received by said third and fourth thruster means being independent of said ambient pressure environment; and
   said roll servo electrical input being responsive to said roll input control signal for proportionally controlling the amount of gas reaching said control inputs of said fifth and sixth vortex amplifiers and ultimately the amount of gas reaching said fifth and sixth thruster means, said control inputs of said fifth and sixth vortex amplifiers receiving equal amounts of gas when said roll input control signal corresponds to zero error, said amount of gas received by said fifth and sixth thruster means being independent of said ambient pressure environment.

2. A proportional mass expulsion thrust control system as claimed in claim 1 further comprising:
   first, second and third differential amplifiers each having first and second inputs and an output,
   said first inputs of said first, second and third amplifiers being responsive to said yaw, pitch, and roll input control signals, respectively;
   said outputs of said first, second, and third amplifiers being connected to said electrical inputs of said yaw, pitch and roll servos respectively;
   first transducer means for generating a first electrical signal corresponding to the difference in outputs of said first and second thruster means;

means for coupling said first electrical signal to said second input of said first differential amplifier;
second transducer means for generating a second electrical signal corresponding to the difference in outputs of said third and fourth thruster means;
means for coupling said second electrical signal to said second input of said second differential amplifier;

third transducer means for generating a third electrical signal corresponding to the difference in outputs of said fifth and sixth thruster means; and
means for coupling said third electrical signal to said second input of said third differential amplifier.